Jan. 1, 1935. W. C. CROSS 1,986,046
GARDEN ORNAMENT
Original Filed Feb. 24, 1930  2 Sheets-Sheet 1
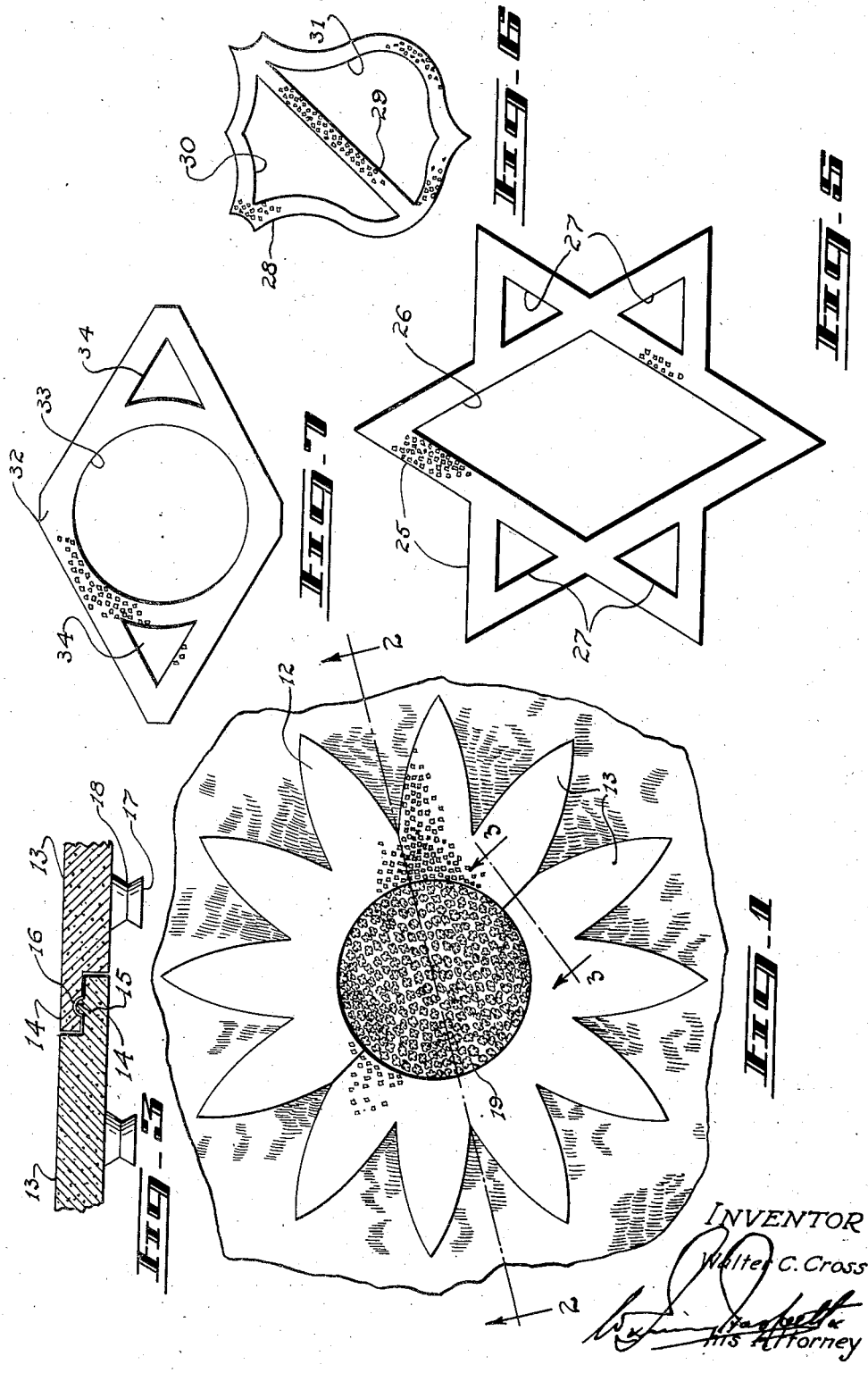

Jan. 1, 1935.  W. C. CROSS  1,986,046
GARDEN ORNAMENT
Original Filed Feb. 24, 1930  2 Sheets-Sheet 2
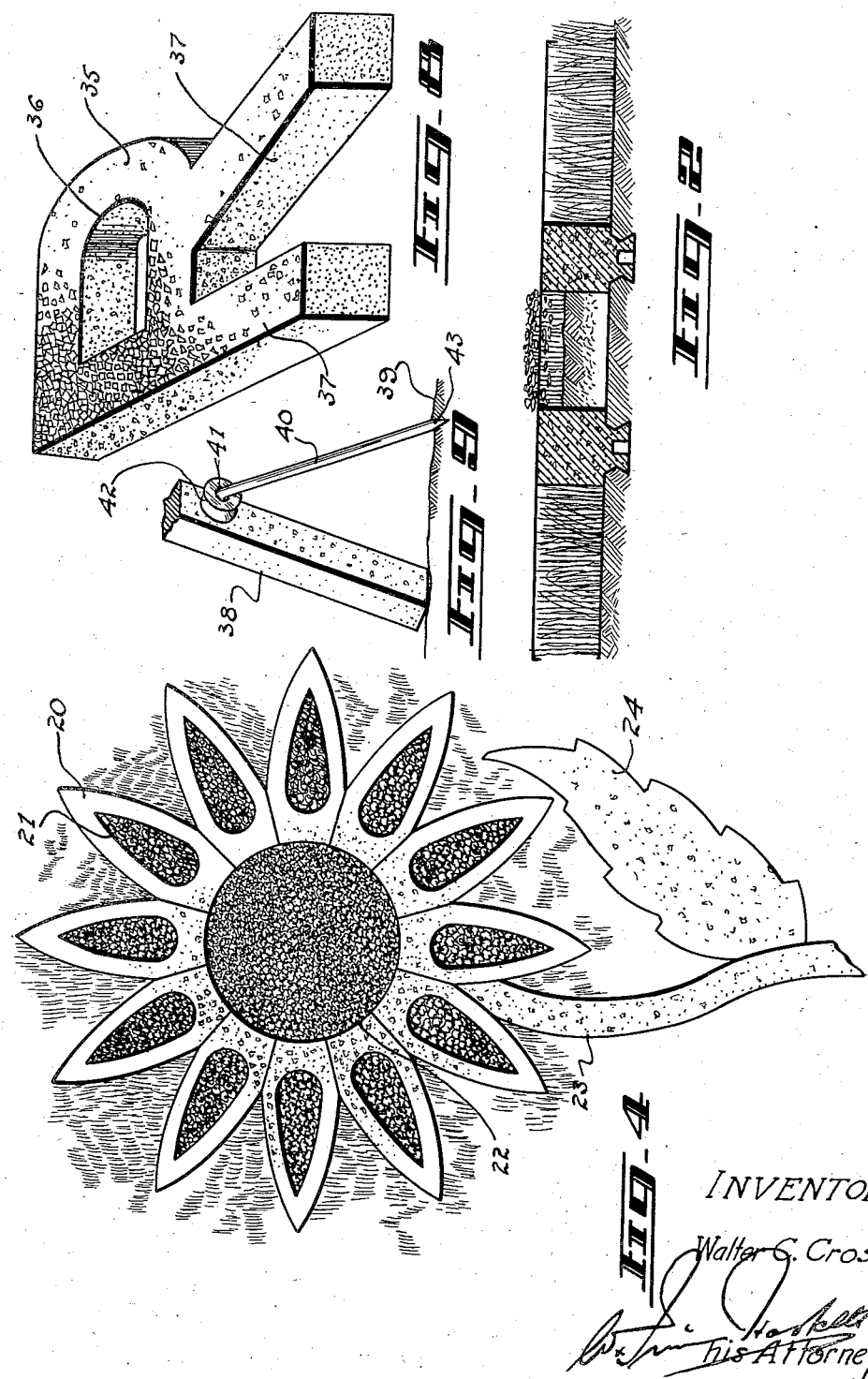
INVENTOR
Walter C. Cross Patented Jan. 1, 1935

1,986,046

UNITED STATES PATENT OFFICE 1,986,046

GARDEN ORNAMENT

Walter Carson Cross, Ottawa, Ontario, Canada, assignor to Stoneway Craft Limited, Ottawa, Ontario, Canada, a corporation Application February 24, 1930, Serial No. 430,902
Renewed May 22, 1934

2 Claims. (Cl. 47—33)

This present invention relates to certain new and useful improvements in a garden ornament.

The primary object of the invention resides in the provision of a garden ornament, a portion of which is in the form of a manufactured article.

Another object of the invention resides in the provision of a garden ornament of the character stated which is partially produced by the natural growth or cultivated growth in the garden or lawn while the remainder or balance of the ornament is in the form of a manufactured article.

A further object of the invention resides in the provision of a garden ornament of the character stated which comprises a manufactured or non-growing article, arranged on a surface and combining with selected natural growth from beneath the surface to form a complete design and background therefor.

A still further object of the invention resides in the provision of a garden ornament of the character stated including an outline of an inanimate nature arranged in combination with an animate or natural live growth to form a complete design and background on a surface.

A still further object of the invention resides in the provision of a garden ornament of the character stated and the process of producing an ornamental design in a garden on a lawn or other surface whereby a predetermined complete design and background may be produced by arranging the manufactured garden ornament with respect to a natural growth or other means employed around the outline of the manufactured garden ornament and within openings of the same.

A still further object of the invention resides in the provision of a garden ornament of the character stated which is adapted to use for producing various designs on different surfaces and may be employed for various purposes.

The invention has for a still further object the provision of a garden ornament of the character stated, the manufactured or inanimate portion of which may be readily produced at the minimum cost in any desired form or configuration and manufactured from various materials or combinations of materials.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described, when reference is had to the drawings forming a part of this disclosure, wherein like characters indicate like parts throughout the several views.

In the drawings:—

Figure 1 is a plan of a complete flat design of a daisy and background produced with one type of the manufactured garden ornament;

Figure 2 is a transverse vertical section through the design as shown in Figure 1, said view being taken substantially on the plane of line 2—2 of Figure 1, looking in the direction indicated by the arrows;

Figure 3 is a detail fragmentary vertical section, taken substantially on the plane of line 3—3 of Figure 1, looking in the direction indicated by the arrows;

Figure 4 is a view similar to Figure 1, showing a modified form or type of manufactured garden ornament;

Figure 5 is a view similar to Figures 1 and 4, showing the manufactured garden ornament as representing a pair of crossed triangles;

Figure 6 is a plan of the manufactured ornament in the form of a shield;

Figure 7 is a plan of the manufactured ornament in the form of a geometrical design;

Figure 8 is a perspective of the manufactured ornament in the design of a letter R; and Figure 9 is a perspective of a conventional form of the manufactured ornament, showing the same supported on an incline with respect to the surface on which it rests.

Referring more in detail to the drawings, it is to be noted that the manufactured or moulded ornament 12, which is shown in this view in the form of a daisy with solid petals, is produced in halves or sections 13 which are adapted to be brought close together with their upper edges flush by overlapping of their flanges 14 at their meeting edges, one of said flanges 14 having a bead or tongue 15 formed on its upper face for engagement in the groove 16 provided therefor in the underface of the flange 14 of the other or adjacent section or half 13. Thus, the sections or halves 13 are firmly held together and prevented from moving independently of one another. In this condition they are arranged on a surface and the complete manufactured ornament is retained in position on the surface by the feet 17 provided on the underface thereof and adapted to sink into the surface. The feet 17 are preferably provided with central V-shape annular grooves 18 around their sides so that the loose earth may gather therein and thus firmly anchor the ornament in position. In this form of the ornament, the centre 19 thereof is open to disclose any selected growth of vegetation planted therein, such as may be considered appropriate to represent the centre of a natural daisy. The petals of the daisy formed with the body of the ornament as manufactured, may be finished with a white surface or facing and the grass or other natural growth of vegetation surrounding the manufactured ornament is arranged and trained to grow between and close to the edges of the daisy petals or outer portion of the manufactured ornament, thus serving as a background for the design to complete the same.

In Figure 4 of the drawings, the manufactured ornament in the form of a daisy is shown with each petal 20 formed separately and provided with a central opening 21 or open centre substantially corresponding to the shape of the petal. These separate petals are slightly tapered at their inner ends and brought together and united as in the preferred form or in any other appropriate manner. The central openings 21 or open centres of the several petals 20 may be filled in by a live growth of vegetation of an appropriate character to harmonize or blend with the facing of the petals 20. Likewise, the large open centre 22 within the circle described by the inner ends of the radiating petals 20 may be filled in by an appropriate growth of vegetation. A stem 23 is also provided for this form of the ornament and faced to represent the stem for the flower. A leaf 24 is extended from the side of the stem 23 and appropriately faced to present the appearance of a natural leaf differing from the surrounding growth of vegetation. The stem 23 and leaf 24 may be formed with one or more of the petals 20 or may be formed separately therefrom and also separate from one another and provided with means for firmly uniting them and also for attaching them to one or more of the petals 20. They may also be provided with anchoring means as described in the first form and each petal 20 may carry one or more of the anchoring feet 17 or other means for preventing the petals from moving on the surface.

In Figure 5 of the drawings, the ornament is shown as representing a pair of crossed triangles 25 presenting a large diamond shaped central opening 26 and four small triangular openings 27 outwardly thereof, through which openings 26 and 27 may be trained natural growths of vegetation, in addition to the natural growth of vegetation trained around the ornament and close to the outline of the crossed triangles 25. This form may be in one piece or in several sections, as desired.

In Figure 6 of the drawings, the ornament is shown in the form of the outline of a conventional shield 28 with a band 29 extended diagonally across the same, thus dividing the central opening of the ornament into substantially triangular sections 30 and 31 through which may be trained the natural growth of vegetation selected for the purpose, in addition to the natural growth of vegetation trained around the shield design to form the background therefor.

In Figure 7 the ornament is shown as being of a geometrical design 32. Through the large openings 33 and smaller triangular openings 34 may be trained selected types of natural growth of vegetation while the natural growth of vegetation forming the background for the design is trained around and close to the geometrical design 32.

In Figure 8, the ornament is shown in the form of a large capital R 35, through the opening 36 of which a selected growth of vegetation may be trained as well as between the legs 37 of the ornamental letter design and around the same for completing the design and the background therefor.

As shown clearly by Figure 9, the manufactured ornament 38 may be supported on an incline on the surface 39 by one or more supporting legs 40 having an upper end resting in an opening 41 in one of the feet 42, while the lower end of the supporting leg 40 terminates in a point 42 engaging in and extending through the surface 39. When the ornament 38 is placed flat on the surface 39, the foot 42 functions in the usual manner as described for the preferred form to anchor the ornament 38 and prevent movement thereof on the surface.

As the construction of the device has thus been described in detail, brief reference is now had to its use and modus operandi: The ornament is manufactured in various designs and produced from appropriate materials. For instance, the ornament may be molded from cement or other plastic material and provided with a facing of a different character from the body of the ornament and of a different colour or colour design, when desired. The object of providing one or more openings in the manufactured ornament is for the purpose of training a selected natural growth through the same when the ornament is permitted to rest flat upon the ground or other surface from which a natural growth of vegetation is extending. Thus, any preferred natural growth of vegetation may be trained through the opening or openings of the ornament to combine with the manufactured ornament in producing a complete design while the background for the design is formed by the natural growth of vegetation around and trained close to the outer edge of the manufactured ornament. It is apparent that the complete design and background is therefore produced by a combination of the manufactured ornament and the trained natural growth of vegetation through and around the manufactured ornament. Thus, the complete design and its background includes both the inanimate manufactured article or ornament and the animate or live trained natural growth through and around the manufactured article or ornament with these animate and inanimate parts of the complete design and background alternating. It is also apparent that the manufactured article or ornament may be employed in connection with other surfaces as well as ground surfaces from which animate or live growths of vegetation emanate or may be supported on an incline with respect to the surface and the openings in the manufactured article or ornament filled with an appropriate material to give the effect desired or left vacant, as preferred.

From the foregoing description taken in connection with the accompanying drawings, it will be manifest that a garden ornament is provided that will fulfill all the necessary requirements of such a device, but as many changes could be made in the above description and many apparently widely different embodiments of my invention may be constructed within the scope of the appended claims without departing from the spirit or scope thereof, it is intended that all matters contained in the said accompanying specification and drawings, shall be interpreted as illustrative and not in a limited sense.

Having thus described my invention, what I claim as new and desire to secure by Letters Patent is:—

1. A garden ornament including a flat sectional horizontal moulded design with superposed horizontal edges of adjacent sections reduced in thickness with the upper edges of said sections flush; and a central longitudinal interlocking tongue and groove connection between the opposed faces of said superposed horizontal edges of the sections.

2. A garden ornament including a flat moulded design outlining member with integral circular depending anchoring member having continuous central encircling V-shaped grooves reducing the horizontal circumference of said anchoring members at their centers.

WALTER CARSON CROSS.